United States Patent [19]

Miyatuka et al.

[11] 4,455,345

[45] Jun. 19, 1984

[54] MAGNETIC RECORDING MEDIUM

[75] Inventors: Hajime Miyatuka; Akira Kasuga, both of Kanagawa, Japan

[73] Assignee: Fuji Photo Film Co., Ltd., Kanagawa, Japan

[21] Appl. No.: 457,319

[22] Filed: Jan. 11, 1983

[30] Foreign Application Priority Data

Jan. 11, 1982 [JP] Japan .................................. 57-2420

[51] Int. Cl.$^3$ ............................................. H01F 10/02
[52] U.S. Cl. .................................... 428/332; 428/457; 428/694; 428/695; 428/697; 428/698; 428/900
[58] Field of Search .............. 428/332, 457, 694, 695, 428/697, 698, 900

Primary Examiner—Bernard D. Pianalto
Attorney, Agent, or Firm—Sughrue, Mion, Zinn, Macpeak & Seas

[57] ABSTRACT

A magnetic recording medium is disclosed. The medium is comprised of a support having a magnetic layer coated thereon. The magnetic layer is comprised of ferromagnetic metal powder and a binder. The ferromagnetic metal powder has a specific surface area of 35 to 70 m$^2$/g, a saturation magnetization ($\sigma_s$) of 120 to 160 emu/g and a metal content of 75 to 98 wt %. The magnetic recording medium has a high S/N ratio, particularly a high video S/N ratio and has stable magnetic properties.

10 Claims, No Drawings

1

MAGNETIC RECORDING MEDIUM

FIELD OF THE INVENTION

The present invention relates to a magnetic recording medium using a ferromagnetic metal powder, and more particularly relates to a magnetic recording medium suitable for high density recording.

BACKGROUND OF THE INVENTION

Ferromagnetic powders which have been employed for a magnetic recording medium include maghemite, cobalt-doped maghemite, magnetite, cobalt-doped magnetite, berthollide of maghemite and magnetite, cobalt-doped berthollide of maghemite and magnetite and chromium dioxide. However, magnetic properties of these powders such as coercivity ($H_c$) or maximum residual magnetic flux density ($B_r$) are insufficient for making a so-called high density recording, and are not suitable for recording a magnetic signal having a short recording wavelength (not longer than about 1 $\mu$m) or for making a tape having a narrow track width (not more than about 50 $\mu$m). A great deal of research and development of ferromagnetic powders having better characteristics for high density recording has been carried out.

Well known methods for preparing ferromagnetic metal powders include the following:

(1) a method which comprises thermally decomposing an organic acid salt of ferromagnetic metal and reducing it with a reducing gas, as disclosed in U.S. Pat. Nos. 3,574,683, 3,574,685, 3,855,016, 3,843,349 and 3,892,673;

(2) a method which comprises reducing an acicular oxyhydroxide, which can contain one or more other metals, or an acicular iron oxide obtained from the oxyhydroxide (iron oxide reduction method), as disclosed in Japanese Patent Application (OPI) No. 97738/74 (the term "OPI" as used herein refers to a "published unexamined Japanese patent application"), U.S. Pat. Nos. 3,607,219 and 3,702,270;

(3) a method which comprises evaporating a ferromagnetic metal in an inactive gas under low pressures (low pressure evaporation method), as disclosed in Japanese Patent Publication Nos. 15320/74 and 18160/74;

(4) a method which comprises thermally decomposing a metal carbonyl compound, as disclosed in U.S. Pat. Nos. 3,172,776, 3,200,007 and 3,262,812;

(5) a method which comprises electrically separating a ferromagnetic metal powder using a mercury cathode and then separating the resulting metal powder from the mercury, as disclosed in U.S. Pat. Nos. 3,156,650 and 3,262,812;

(6) a method which comprises reducing a ferromagnetic metal salt by adding a reducing agent to a solution of the ferromagnetic metal salt (borohydride method), as disclosed in U.S. Pat. Nos. 3,669,643, 3,672,867 and 3,726,664.

Of these methods, methods (2), (3) and (6) are conventional due to their practicality and the characteristics of the medium produced, and method (2) is most practical from the economical standpoint.

A ferromagnetic metal powder has coercivity ($H_c$) and saturation magnetization ($\sigma_s$) more than conventional ferromagnetic powders such as iron dioxide or chromium dioxide, and, therefore, is expected to be useful as a ferromagnetic powder for high density recording medium. In particular, recent trends in video tape recorders (VTR) are to reduce their size so that the recorders can be integrated with a video camera and get to improve image and sound qualities over those of VHS/$\beta$ systems presently used. However, there are many problems when the ferromagnetic metal powders are employed for high density recording. One problem is that metal particles coagulate with each other due to the large saturation magnetization, and, hence, it is difficult to obtain a magnetic layer having better surface property where they are coated on a non-magnetic support. Accordingly, there are problems of obtaining sufficient output due to the spacing loss generated between the magnetic head and recording tape. Further, more noise is present and a high S/N cannot be obtained. Another problem is that the metal particles are easily oxidized or hydroxidized due to the use of metal powder, and, hence, the magnetic properties of the resulting metal powder deteriorate.

Various methods have been proposed to improve these problems. However, it is difficult to satisfy the characteristics of magnetic recording medium and the stability of ferromagnetic metal powder, simultaneously. For example, it is proposed that surfaces of metal powders are gradually oxidized to improve the stability of the metal powders. An oxidized layer is formed around the powders to guarantee the stability. However, this causes the saturation magnetization ($\sigma_s$) to be lowered and a magnetic recording medium having high S/N ratio cannot be obtained. The stability is worse as the metal particles are smaller. The stability can be increased by mixing the metal powders with a binder to make a magnetic layer, but is is not still sufficient.

SUMMARY OF THE INVENTION

A first object of the invention is to provide a magnetic recording medium having a high S/N ratio, particularly video S/N ratio.

A second object of the invention is to provide a magnetic recording medium having a magnetic layer that provides stable magnetic properties.

As the results of various research, the present inventors have found that the above objects of the invention can be achieved by mixing a ferromagnetic metal powder having a specific surface area of 35 to 70 m$^2$/g, a saturation magnetization ($\sigma_s$) of 120 to 160 emu/g and a metal content of 75 to 98 wt% with a binder to prepare a magnetic layer.

DETAILED DESCRIPTION OF THE INVENTION

In the invention, the specific surface area is a value obtained by adsorbing a nitrogen gas with a B.E.T. method. When the specific surface area is less than 35 m$^2$/g, magnetic powders having a comparatively high saturation magnetization are obtained by the surface property of the magnetic layer is limited. Particularly, where higher recording density of not more than 1 $\mu$m of recording wavelength is required, sufficient S/N ratio cannot be obtained. When the specific surface area is more than 70 m$^2$/g, an oxidation reaction proceeds markedly on the metal surface and, therefore, the metal powders show high saturation magnetization just after their preparation but the saturation magnetization decreases in a short time thereafter. Therefore, a magnetic recording medium having a high S/N ratio cannot be obtained.

As a result of various experiments by the present inventors, it has been found that the preferred range of specific surface area satisfies both the stabilization of the ferromagnetic metal powder and the surface property of the magnetic layer. The preferred range of the specific surface area is 35 to 70 m$^2$/g, preferably 40 to 65 m$^2$/g, more preferably 45 to 60 m$^2$/g.

The saturation magnetization ($\sigma_s$) obtained with the present invention is 120 to 160 emu/g. When the saturation magnetization is less than 120 emu/g, a maximum magnetic flux density ($B_m$) cannot be high whereby a sufficient output cannot be obtained. On the other hand, when the saturation magnetization is more than 160 emu/g, the metal powder is coagulated in a coating composition and, hence, a magnetic layer having a smooth surface cannot be obtained. More preferable saturation magnetization is 125 to 150 emu/g, most preferably 128 to 145 emu/g.

If the metal content is less than 75 wt%, the stability of the metal powder is better but the saturation magnetization is insufficient and a magnetic layer having a sufficiently high output level cannot be obtained. On the other hand, if the metal content is more than 98 wt%, the metal powder is unstable. The metal content is preferably 78 to 95 wt%, more preferably 80 to 93 wt%.

In the present invention, magnetic properties such as $\sigma_s$ or $B_m$ are values which are measured by a vibration sample-type magnetic flux meter (trade name "VSM-III", manufactured by Toei Kogyo Co., Ltd.). The metal content of the magnetic powder is a value which is measured by an atomic extinction analysis of a hydrochloric acid solution of the metal powder.

A ferromagnetic metal powder used in the present invention can be prepared by any of the methods (1) to (6) as described above. However, an iron oxide reduction method, a low vacuum evaporation method and a borohydride method are preferred from the practical standpoint. The iron oxide reduction method is particularly preferred.

The particle size of the ferromagnetic metal powder particles does not necessarily correspond to a specific surface area. The reason why the particle size does not necessarily correspond to the specific surface area is apparently because porous metal particles are formed while an acicular shape of iron dioxide which is a starting material is maintained during a dehydrating reaction and a deoxidizing reaction in the synthesis of metal particles by reducing the iron oxide. According to the research of the present inventors, it is confirmed that the specific surface area has a more intimate relationship with characteristics such as S/N ratio or stability of the metal powder than the size of the metal powder particles.

Various methods can be used to increase the $B_m$. However, the most useful method is to control the amount of binder. The volume ratio of magnetic metal powder and binder is preferably 2:1 to 1:2, preferably 1.5:1 to 1:1.5.

In order to improve the surface properties, it is important for the magnetic metal powder to be sufficiently kneaded with and dispersed in a binder, and that the surface of the magnetic layer be carefully formed after the coating step.

If the magnetic powder satisfies the conditions of the invention, sufficient $B_m$ and surface properties of the magnetic layer can be easily obtained.

The coercivity ($H_c$) of the metal powder of the invention is not limited and is generally determined in combination with a magnetic head. When a ferrite head is used, the $H_c$ of the magnetic recording medium is preferably not more than 1,300 Oe, and when a metal-type head such as a sendust or amorphous is used, the $H_c$ must be 1,300 Oe or more.

The ferromagnetic metal particles are preferably in the form of a needle or necklace because the $H_c$ can be maintained by utilizing geometric anisotropy.

The components of the ferromagnetic metal powder are not limited and, for example, may be Fe or an alloy of Fe and Co and/or Ni. An alloy of Fe and 1 to 15 wt% of Ni is preferred because stability is improved, and an alloy containing Co is preferred to maintain some degree of $H_c$. Therefore, more preferable examples of ferromagnetic metal powders in the invention are Fe-Co-Ni alloy and Fe-Ni alloy.

A method for producing a magnetic recording medium of the present invention which comprises kneading a ferromagnetic metal powder and a binder and coating the thus-obtained coating composition on a non-magnetic support can be carried out by well-known methods as disclosed in, for example, U.S. Pat. No. 4,135,016.

The coating compositions include a ferromagnetic metal powder, a binder and a solvent as main components, and if necessary, a dispersing agent, a lubricant, an abrasive agent and an antistatic agent.

Binders used with the ferromagnetic metal powder in the present invention include conventional thermoplastic resins, thermosetting resins, reactive resins and mixtures thereof. Specifically, the binder may be a cellulose resin, a polyvinyl chloride copolymer, a polyurethane resin which can be hardened with an isocyanate compound, a butadiene resin, an acryl copolymer and an epoxy resin. These binders can be used alone or in combination, and other additives can be added to the binder. The blinder is generally present in an amount of 10 to 50 parts by weight based on 100 parts by weight of the ferromagnetic metal powder.

A liquid lubricant such as a fatty acid, a fatty acid ester or a silicone oil, or a solid lubricant such as graphite or molybdenum disulfide may be used.

A conventional abrasive agent may be added which preferably has particles having not less than 6 of Moh's hardness, for example, fused alumina, silicon carbide, carbon dioxide, corundum, artificial corundum, diamond, artificial diamond, garnet, emery, etc.

The magnetic layer of this invention can be formed by dissolving the above components in an organic solvent or mixing them with the solvent to prepare a coating composition and then coating the coating composition on a non-magnetic support, and drying it. The mixing and dispersing steps are carried out using a kneading or dispersing device such as a ball mill, an atomizer or a sand mill.

The magnetic layer provided on a support is optionally subjected to magnetic orientation and then dried. If necessary, the magnetic layer is calendered to obtain a smooth surface layer. The coated materials are then slit into any desired width to provide magnetic recording tapes or discs. The surface smoothening treatment is important in the preparation of the magnetic recording medium using a ferromagnetic metal powder.

The non-magnetic support may be in the form of a film, a tape or a sheet. When a high density magnetic recording medium is prepared, the surface roughness of the magnetic layer should be not more than 2 μm. The support used in this invention may be a polyester such as polyethylene terephthalate, a polyolefin such as polypropylene, a cellulose derivative such as cellulose triacetate or cellulose diacetate, a polycarbonate, a polyamide, a polyimide or a polyamide-imide.

In the present invention, more advantages can be obtained when a fatty acid ester is added in an amount of not less than 1 wt%, preferably 1 to 12 wt%, based on the ferromagnetic metal powder, and an abrasive agent having not less than 6 of Moh's hardness is added in an amount of not less than 1 wt%, preferably 1 to 10 wt%, based on the ferromagnetic metal powder. That is, abrasion of magnetic layer due to contact with a head or travelling system in a VTR is improved, the problem of staining of the head or travelling system in a VTR such as guide poles is improved. Further, there is less abrasion of the magnetic layer due to the conact of the recording meidum with a head or travelling system. However, if the amount of fatty acid ester is increased beyond 12 wt%, running properties of the medium are worse. If the amount of the abrasive agent is increased beyond 10 wt%, the $B_m$ decreases and the output level is lowered. Therefore, upper limit of the fatty acid ester and the abrasive agent are 12 wt% and 10 wt%, respectively.

The fatty acid ester which can be used in the present invention includes esters of a monobasic fatty acid having 2 to 20 carbon atoms and a monohydric alcohol having 3 to 12 carbon atoms. Typical examples of the esters are butyl stearate, amyl stearate and butoxyethyl stearate.

According to the present invention, a magnetic recording medium having good stability even with the passage of time and a high S/N ratio can be obtained. That is, the output level using a carrier wave of 4 MHz in a VHS type VTR can be more than +8 dB as compared with the standard VHS recording tape, and a modulation noise C/N at 3 MHz is more than +6 dB as compared with the standard VHS recording tape. Further, a stability of dispersion that is prepared by dispersing metal particles in a binder solution, and the magnetic properties of the medium (e.g., stability under the passage of time) are improved. The advantages of this invention depend on the specific surface area, $\sigma_s$ and metal content, and, therefore, it is important that the physical values are within the ranges described above.

The present invention is described in more detail by the following Examples and Comparative Examples. However, the scope of the invention is not limited to these Examples. In the Examples and Comparative Examples, all parts are by weight.

EXAMPLES 1 TO 5

Goethite ($\alpha$-FeOOH) was reduced in a hydrogen gas to obtain each of the ferromagnetic metal powders as shown in the following Table.

| Example No. | Coercivity ($H_c$) (Oe) | Saturation Magnetization ($\sigma_s$) (emu/g) | Specific Surface Area (m²/g) | Metal Content (wt %) |
|---|---|---|---|---|
| 1 | 1,390 | 123 | 36 | 88 |
| 2 | 1,480 | 133 | 42 | 84 |
| 3 | 1,520 | 141 | 51 | 82 |
| 4 | 1,300 | 138 | 61 | 78 |
| 5 | 1,420 | 128 | 68 | 80 |

Magnetic properties of metal powder and magnetic tape are shown by the value which was measured by a vibration sample magnetometer ("VSM-III" manufactured by Toei Kogyo Co., Ltd.) in a 5 kOe magnetic field. The specific surface area was measured by the B.E.T. method and Quantasorb manufactured by Yuasa Electric Industry Co., Ltd.

To 300 g of the above ferromagnetic metal powder, the following composition was added respectively and kneaded for 48 hours.

| | |
|---|---|
| Maleic acid-containing vinyl chloride/ vinyl acetate copolymer (polymerization degree: about 400, ratio of vinyl chloride, vinyl acetate and maleic acid: 86:13:1) | 30 parts |
| Polyester type polyurethane (reaction product of ethylene adipate and 2,4-trilene-diisocyanate; average molecular weight: about 110,000) | 20 parts |
| Palmitic acid | 5 parts |
| Butyl stearate | 5 parts |
| $\alpha$-Alumina | 6 parts |
| Butyl acetate | 500 parts |
| Methyl isobutyl ketone | 400 parts |

After dispersing, a 75 wt% of ethyl acetate solution of 25 parts of a triisocyanate compound, i.e., an adduct of 3 mol of trilenediisocyanate and 1 mol of trimethylolpropane (trade name: "Dismodule L-75" manufactured by Bayer A.G.), was added and dispersed for 1 hour with a high speed shearing force to provide a magnetic coating composition.

The coating composition was coated on a polyethylene terephthalate film having a thickness of 14 μm. After coating the film was subjected to magnetic orientation, dried, and treated by a calendering step. The film was then slit into a ½ inch width to obtain a video recording tape having a magnetic layer of dry thickness of about 3 microns.

The magnetic tape obtained was found to have the magnetic properties and electromagnetic properties as shown in Table 1.

TABLE 1

| Example | $H_c$ (Oe) | $B_m$ (Gauss) | Squareness Ratio | Demagnetization (%) | Video Output Level at 4 MHz (dB) | C/N (dB) |
|---|---|---|---|---|---|---|
| 1 | 1,200 | 2,800 | 0.78 | 7 | +8.0 | +6.5 |
| 2 | 1,270 | 3,300 | 0.76 | 8 | +9.0 | +8.0 |
| 3 | 1,300 | 3,800 | 0.77 | 8 | +10.0 | +9.0 |
| 4 | 1,080 | 3,100 | 0.74 | 9 | +9.5 | +8.5 |
| 5 | 1,310 | 2,600 | 0.73 | 12 | +8.5 | +7.5 |

Magnetic properties were measured by a vibration sample magnetometer (trade name: "VSM-III", manufactured by Toei Kogyo Co., Ltd.).

Demagnetization was shown by a reducing ratio of magnetic tape which was kept for 1 week at 60° C. and 90% R.H. (relative humidity).

Video characteristic was measured by VHS type VTR (trade name: "NV 8200", manufactured by Matsushita Electric Industries Co., Ltd.) of which recording and reproducing head was changed by a sendust alloy head having a gap of 0.3 μm and a track width of 30 μm.

Standard recording tape was Fuji video cassette T-120 E manufactured by Fuji Photo Film Co., Ltd.

The C/N ratio was the ratio of the carrier signal to the noise level. This ratio has a substantial correlation with the S/N ratio of TV signal. The C/N ratio was measured by recording a carrier signal at 4 MHz and reproducing a modulation signal at 3 MHz as a noise level.

COMPARATIVE EXAMPLES 1 TO 4

The same procedure as described in Example 1 was repeated except that the following ferromagnetic metal powder was used instead of the metal powder used in Example 1.

| Comparative Example | $H_c$ (Oe) | $\sigma_s$ (emu/g) | Specific Surface Area (m²/g) | Metal Content (wt %) |
|---|---|---|---|---|
| 1 | 1,400 | 125 | 28 | 85 |
| 2 | 1,380 | 115 | 38 | 81 |
| 3 | 1,550 | 105 | 41 | 72 |
| 4 | 1,600 | 130 | 75 | 78 |

Characteristics of thus obtained magnetic recording tapes are shown in Table 2.

In comparison with the magnetic recording tapes shown in Table 1, the video characteristics of the Comparative Examples are lower. It is particularly apparent from Example 4 and Comparative Example 4 that the difference in the $B_m$ is due to a decrease in $\sigma_s$, while the demagnetization is the same.

TABLE 2

| Comparative Example | $H_c$ (Oe) | $B_m$ (Gauss) | Squareness Ratio | Demagnetization (%) | Video Output Level at 4 MHz (dB) | C/N (dB) |
|---|---|---|---|---|---|---|
| 1 | 1,280 | 2,800 | 0.77 | 6 | +7.5 | +5.5 |
| 2 | 1,210 | 2,400 | 0.79 | 8 | +6.0 | +5.0 |
| 3 | 1,420 | 2,100 | 0.76 | 5 | +5.5 | +4.5 |
| 4 | 1,440 | 2,900 | 0.73 | 9 | +7.0 | +6.0 |

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising: a support having coated thereon; a magnetic layer containing a ferromagnetic powder and a binder, said ferromagnetic metal powder having a specific surface area of 35 to 70 m²/g, a saturation magnetization ($\sigma_s$) of 120 to 160 emu/g and a metal content of 75 to 98 wt%.

2. A magnetic recording medium as claimed in claim 1, wherein the ferromagnetic powder has a specific surface area within the range of 40 to 65 m²/g.

3. A magnetic recording medium as claimed in claim 2, wherein the specific surface area of the ferromagnetic powder is within the range of 45 to 60 m²/g.

4. A magnetic recording medium as claimed in claim 1, wherein the ferromagnetic powder has a saturation magnetization ($\sigma_s$) within a range of 125 to 150 emu/g.

5. A magnetic recording medium as claimed in claim 4, wherein the ferromagnetic powder has a saturation magnetization ($\sigma_s$) within the range of 128 to 145 emu/g.

6. A magnetic recording medium as claimed in claim 1, wherein the ferromagnetic powder has a metal content within the range of 78 to 95 wt%.

7. A magnetic recording medium as claimed in claim 6, wherein the ferromagnetic powder has a metal content within the range of 80 to 93 wt%.

8. A magnetic recording medium as claimed in claim 1, wherein the volume ratio of the ferromagnetic powder to the binder is within the range of 2:1 to 1:2.

9. A magnetic recording medium as claimed in claim 1, wherein the ferromagnetic powder is an alloy of Fe containing 1 to 15 wt% of Ni.

10. A magnetic recording medium as claimed in claim 1, wherein the magnetic layer is further comprised of:
a fatty acid ester present in an amount of 1 to 12 wt% based on the weight of the ferromagnetic powder; and
an abrasive agent having a hardness of 6 Moh's or more present in an amount of 1 to 10 wt% based on the weight of the ferromagnetic powder.

* * * * *